US008631348B2

(12) United States Patent
Petri et al.

(10) Patent No.: US 8,631,348 B2
(45) Date of Patent: Jan. 14, 2014

(54) SEARCH DROP DOWN MENU METHOD AND APPARATUS

(75) Inventors: Jonah Petri, Mountain View, CA (US); Yan Arrouye, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1494 days.

(21) Appl. No.: 11/950,359

(22) Filed: Dec. 4, 2007

(65) Prior Publication Data

US 2009/0144658 A1 Jun. 4, 2009

(51) Int. Cl.
  *G06F 3/00* (2006.01)
  *G06F 3/048* (2013.01)

(52) U.S. Cl.
  USPC ........... 715/810; 715/708; 715/764; 715/780; 715/825; 715/841

(58) Field of Classification Search
  USPC ......... 715/700, 705, 708, 760, 764, 780, 781, 715/783, 810, 811, 817, 818, 825, 841, 843
  See application file for complete search history.

(56) References Cited

U.S. PATENT DOCUMENTS

| 6,950,990 | B2 * | 9/2005 | Rajarajan et al. | 715/736 |
| 7,113,981 | B2 * | 9/2006 | Slate | 709/217 |
| 2002/0129053 | A1 * | 9/2002 | Chan et al. | 707/503 |
| 2003/0135725 | A1 * | 7/2003 | Schirmer et al. | 712/300 |
| 2005/0108220 | A1 * | 5/2005 | Silverbrook et al. | 707/3 |
| 2005/0289109 | A1 * | 12/2005 | Arrouye et al. | 707/1 |
| 2006/0004739 | A1 * | 1/2006 | Anthony et al. | 707/4 |
| 2006/0248078 | A1 * | 11/2006 | Gross et al. | 707/5 |
| 2007/0061308 | A1 * | 3/2007 | Hartwell et al. | 707/3 |
| 2007/0143264 | A1 * | 6/2007 | Szeto | 707/3 |
| 2007/0162422 | A1 * | 7/2007 | Djabarov | 707/2 |
| 2008/0168381 | A1 * | 7/2008 | Nelson et al. | 715/780 |

OTHER PUBLICATIONS

Sharon Crawford, The Windows XP Search Companion Finds it Faster, Sep. 3, 2001, 4 pages.*
How to Search for Files and Folders in Windows XP, Jul. 15, 2004, 2 pages.*

* cited by examiner

*Primary Examiner* — Matt Kim
*Assistant Examiner* — Yongjia Pan
(74) *Attorney, Agent, or Firm* — Schwegman Lundberg & Woessner, P.A.

(57) ABSTRACT

User interface for searching for data are described. In one embodiment, a method, which involves a user interface for searching, includes displaying on a display device a search input region and displaying, immediately adjacent to the search input region, a user interface object which, if selected, cause the display of a menu, disposed adjacent to the user interface object, of selectable search options to configure how to perform the search. The search input region can be configured to receive an input for a search of data on a data processing system coupled to the display device.

20 Claims, 8 Drawing Sheets

User Interface
200

*FIG. 2A*

User Interface
200

SEARCH DROP DOWN MENU METHOD AND APPARATUS

FIELD OF THE INVENTION

Methods for managing data in a data processing system and apparatuses for managing data are described herein.

BACKGROUND OF THE INVENTION

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's Photoshop. Numerous other types of files are capable of being created or modified, edited, and otherwise used by one or more users for a typical data processing system The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file.

Figure 1A:
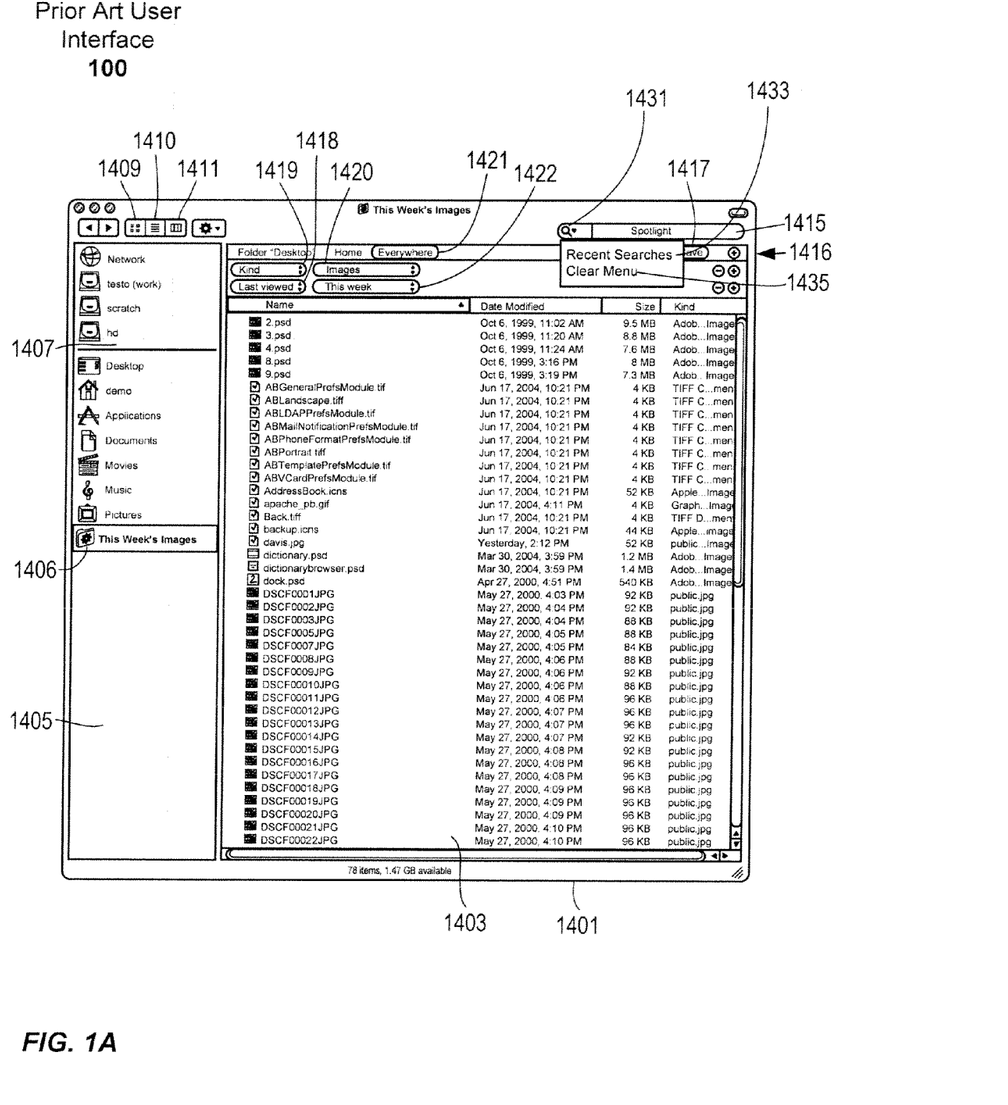
FIG. 1A illustrates an exemplary search program containing a user interface object and search input region with a drop down menu in a user interface display according to the prior art.

These various search programs available today each provide a user interface in order to configure parameters to define the scope of a search. For example, referring to FIG. 1A which illustrates an exemplary search program containing a user interface object and search input region with a drop down menu in a user interface display according to the prior art. FIG. 1A includes portions of FIG. 14A of U.S. Patent Application Publication No. 2005-0289109, which is incorporated by reference herein. FIG. 1A shows examples of a window in a graphical user interface file system, which runs on an operating system, such as a Macintosh operating system. This window shows the results of a particular search and also the ability to save and use a smart folder which saves a prior search. The window 1401 shown in FIG. 1A includes a display region 1403, a user configurable region 1405, a smart folder 1406, a system specified region 1407, an icon view button 1409, a list view button 1410, and a column view button 1411. The window 1401 also includes a text entry region 1415 and a user interface object 1431. The text entry region 1415 is used to input search terms and user interface object 1431 includes a drop down menu of prior/recent searches. FIG. 1A shows the activation of a menu by selecting the search button 1431, causing a display of a menu having two entries 1433 and 1435. Entry 1433 displays recently performed searches and/or other prior searches so that a user may merely recall a prior search by selecting the prior search and cause the prior search to be run again. The menu selection 1435 allows the user to clear the list of recent searches in the menu.

Window 1401 further includes location slice 1416 which may be used to specify the location for the search, which slice also includes a save button 1417. Additional slices below the slice 1416 allow the user to specify further details with respect to the search, in this case specifying types of documents which are images which were last viewed this week. The user has set the search parameters in this manner by selecting the "kind" option from the pull down menu 1419 and by selecting the "images" type from the pull down menu 1420 and by selecting the "last viewed" option from pull down menu 1418 and by selecting "this week" from the pull down menu 1422. The user has also selected "everywhere" by selecting the button 1421 so that the search will be performed on all disks and storage devices connected to this system. The results are shown within the display region 1403. The user can then save the search query by selecting the "save" button 1417 and may name the saved search query as "this week's images" to produce the smart folder 1406 as shown in the user configurable portion 1405. This allows the user to repeat this search at a later time by merely selecting the smart folder 1406 which causes the system to perform a new search again, and all data which matches the search criteria will be displayed within the display region 1403. Thus, after several weeks, a repeating of this search by selecting the smart folder 1406 will produce an entirely different list if none of the files displayed in the display region 1403 of FIG. 1A are viewed in the last week from the time in which the next search is performed by selecting the smart folder 1406.

However, many of the prior art search programs are overly complicated and include require entry of complex search strings and require the presentation of a complicated search menu in order to configure parameters to perform a search.

SUMMARY OF THE INVENTION

A search pull down menu method and apparatus is disclosed. In one embodiment, the search pull down menu comprises a search input region configured to receive an input search string and a user interface object which, if selected, causes the display of a menu of selectable search options to configure how to perform the search. In another embodiment, the search pull down menu ceases to display the user interface object adjacent to the search input region in response to the entry of text in the search input region.

BRIEF DESCRIPTION OF THE DRAWINGS

A better understanding of the present invention can be obtained from the following detailed description in conjunctions with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular computer system or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A method and apparatus for performing a search using a drop down menu of selectable search options to configure how to perform the search is described. As discussed above, prior art systems with drop down menus do not contain selectable search options to configure how to perform a search. Additionally, many of the prior art search programs are overly complicated and require entry of complex search strings and the presentation of a complicated search menu in order to configure parameters to perform a search. Accordingly, what is needed is a method and apparatus to quickly configure a search using selectable parameters in a simple drop down menu format. Such a method and apparatus may include a hierarchical drop down menu with a plurality of selectable search options combined with a text entry region to configure how the search is performed in one simple, user-friendly interface.

Figure 1B:
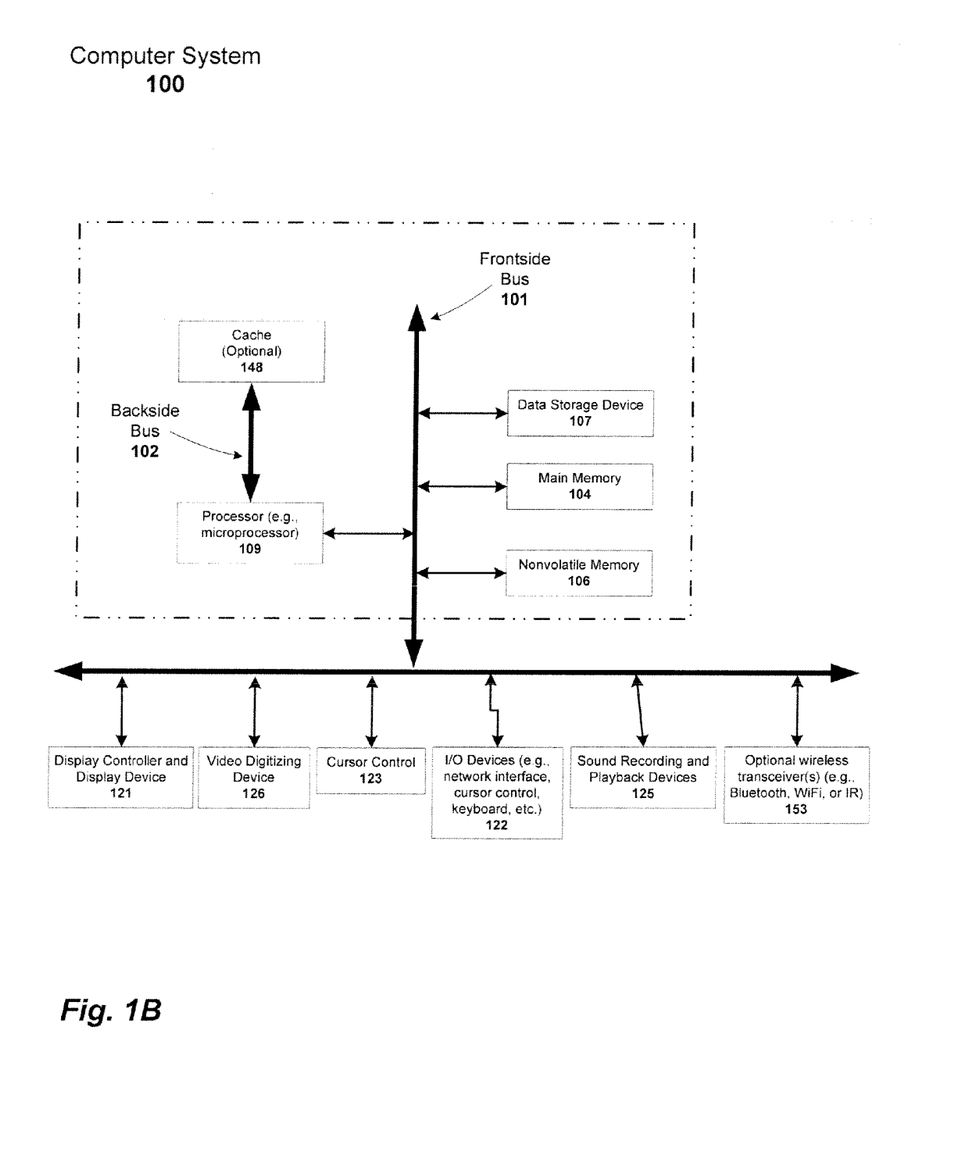
FIG. 1B illustrates an exemplary computer system upon which the methods of the present invention may be implemented.

Referring to FIG. 1B, which illustrates an exemplary computer system 100 upon which embodiments of the present invention can be implemented. Computer system 100 comprises front-side bus 101 and back-side bus 102 (or other communications hardware and software for communicating information) coupled to processor 109 for processing information. Front-side bus 101 is a data path which runs between the CPU and main memory (RAM). Front-side bus 101 also couples data storage device 107, main memory 104, and non-volatile memory 106 to processor 109. Additionally, front-side bus 101 connects to an external bus coupling the processor to display controller and device 121, video digitizing device 126, cursor control device 123, input-output (I/O) devices 122, sound recording and playback devices 125, and optional wireless transceivers 153. Additionally, cache 148 is coupled to processor 109 via back-side bus 102. A back-side bus, such as, back-side bus 102, is the data path and physical interface between the processor and the L1 and/or L2 cache memory (not shown).

Computer system 100 further comprises a random access memory (RAM) or other dynamic storage device (referred to as main memory 104) coupled to bus 101 for storage information and instructions to be executed by processor 109. Main memory 104 also may be used for storing temporary variables or other intermediate information during execution of instructions by processor 109. Computer system 100 also comprises a read only memory (ROM) 106, and/or static storage devices coupled to bus 101 for storing static information and instructions for processor 109. Data storage device 107 is coupled to bus 101 for storing information and instructions.

Furthermore, data storage device 101 may include a magnetic disk or optical disk and its corresponding disk drive, which can be coupled to computer system 100. Computer system 100 can also be coupled, via bus 101, to display device 121 for displaying information to a computer user. Display device 121 typically includes a frame buffer, specialized graphics rendering devices, and a cathode ray tube (CRT) and/or a flat panel display. I/O device 122 including alpha numeric and other keys, is typically coupled to bus 101 for communication information and commands to processor 109. Another type of user input device is cursor control 123, such as a mouse, trackball, pin, touch screen, or cursor direction keys for communication direction information and command selections to processor 109 and for controlling cursor movement on display device 121. This input device typically has two degrees of freedom into axis, a first axis (e.g., x) and a second axis (e.g., y), which allows the device to specify positions in a plane. However, this invention should not be limited to input devices with only two degrees of freedom.

Another device that may be coupled to bus 101 is a device for sound recording and/or playback 125, such as an audio digitizer coupled to a microphone for recording information. Further, the device may include a speaker which is coupled to a digital-to-analog (D/A) converter for playing back the digitized sounds.

Also computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images and transmitted from others on the computer network.

Computer system 100 is useful for supporting computer supported cooperation (CSC—the integration of teleconferencing with mixed media data manipulation) to 2D/3D graphics, image processing, video compressions/decompression recognition algorithms and audio manipulation.

Figure 2A:
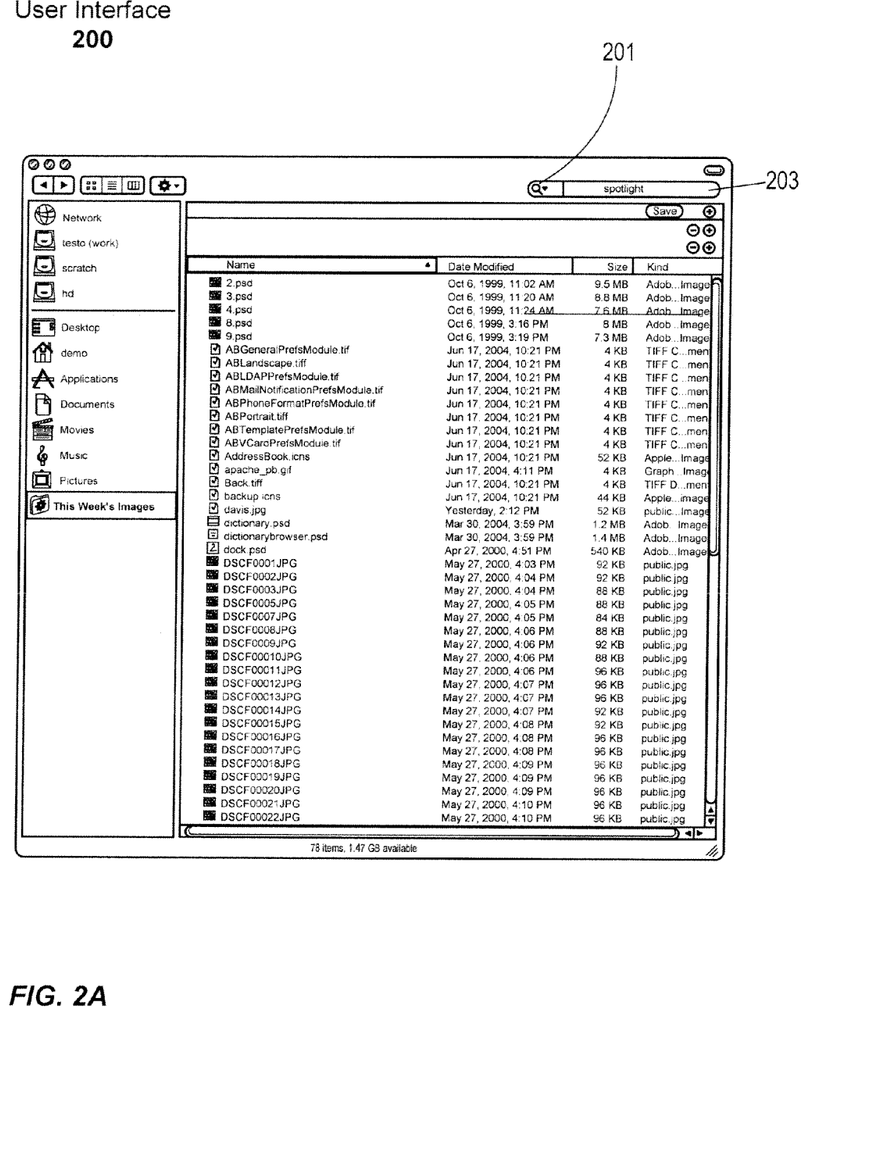
FIG. 2A illustrates an exemplary user interface object and a search input region in a user interface display according to one embodiment of the invention.

Referring to FIG. 2A, which illustrates an exemplary interface object and a search input region in a user interface display according to one embodiment of the invention. FIG. 2A includes user interface 200 which includes a user interface object or icon and a text entry region 203. User interface icon 201 includes an arrow indicating the presence of a drop down menu. However, the invention is not so limited. Embodiments of the invention may include any indicator or other user interface object to indicate the presence of a drop down menu. For example, user interface icon 201 may contain the word "menu" which may be selected to case the presentation of the drop down menu. Text entry region 203 includes a bounded area for inputting search terms or strings. For purposes the purposes of explanation, the search term "spotlight" has been entered into the text entry region 203 and any search performed on user interface 200 would include the term "spotlight" in its scope.

In the case where user interface icon 201 (indicating a drop down menu) is not selected, user interface 201 will be operable to perform a search using the search term "spotlight" and a set of one or more default parameters. The default parameters may be user-defined or may be included as a set of one or more of the most commonly used parameters included with the software. In either case, the search will be performed with default parameters and will not be performed with user-selectable parameters that define a set of search options and configure how the search is performed.

Figure 2B:
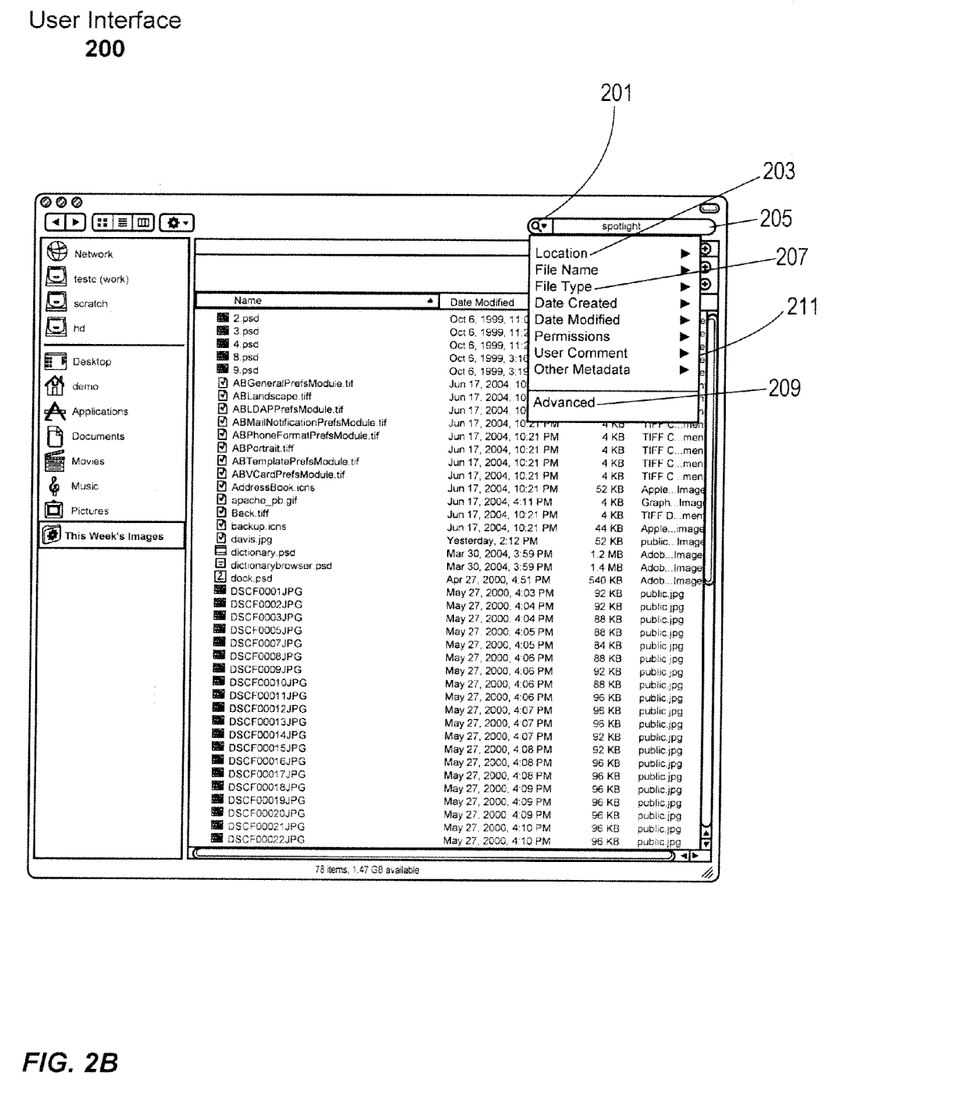
FIG. 2B illustrates an exemplary user interface object and a search input region with a drop down menu in a user interface display according to one embodiment of the invention.

Referring to FIG. 2B, which illustrates an exemplary user interface object and a search input region with a drop down menu in a user interface display according to one embodiment of the invention. In FIG. 2B, user interface icon 201 has been selected resulting in the presentation of the drop down menu 211 disposed adjacent to user interface icon 201. However, the invention is not so limited as other embodiments may have the presentation of drop down menu in other locations within user interface 200. Search drop down menu 211 includes a plurality of search parameter options and/or other search criteria. As such, drop down menu 211 includes both locations for searching as well as various file attributes which may be selected with performing a search. For example, search drop down menu 211 includes file type search parameter 207 to allow a user to select from among various file types. Additionally, drop down menu 211 includes location search parameter 203 in order for a user to define the scope of locations within his or her computer system in which to perform the search.

Drop down menu 211 also includes advanced option 209 which, when selected, causes the presentation of another user interface allowing the selection of a plurality of search criteria. In one embodiment, the other user interface could be a detailed menu with a plurality of search criteria. Advanced option 209 can contain any combination of search parameters and/or criteria including both search criteria located within the parameters of drop down menu 211, such as location 203, or other criteria different and in addition to the parameters contained in search drop down menu 211. However, the invention is not so limited, and any number and/or combination of search parameters and/or criteria may be included within the menu or user interface that is presented when the advanced option 209 search is selected. Additionally, advanced option 209 allows for performing a search on any combination of selectable search options which can be performed one at a time in a serial fashion or several at a time in parallel. Either way, advanced option 209 allows the user flexibility of performing a search with multiple parameters or a single parameter which may or may not be located in the other parameters available in search drop down menu 211. To illustrate this, consider the presentation of the user interface allowing the selection the plurality of search criteria which includes location to specify the location for the search, while at the same time specifying further details with respect to the scope of the search, including for example: document type; kind of document such as "images;" a last viewed option; and a list of metadata contained within files to be selected with each document searched. It should be noted, that some or all of these search options which are presented upon selecting the advanced option 209 of menu 211 include one or more of search parameters 1418-1422 of FIG. 1A. As a result, the present invention of user interface 200 allows for the quick and easy access to a plurality of search criteria in order to customize a search to the user's preference, and these criteria are all contained within one simple drop down menu selectable by user interface icon 201. Furthermore, user interface 200 includes text entry region 205 for inputting search terms as discussed above.

Figure 3:
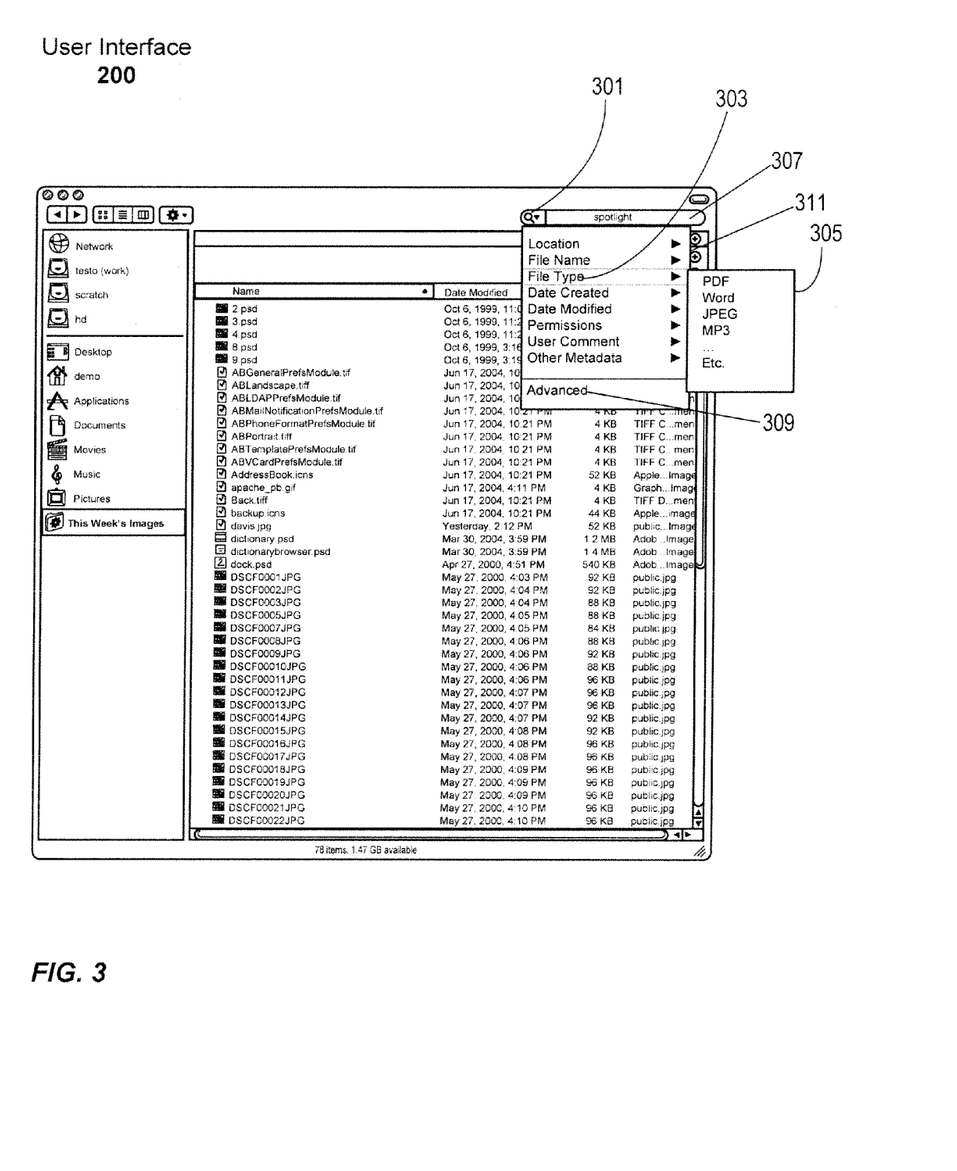
FIG. 3 illustrates an exemplary user interface object and search input region with a hierarchical drop down menu in a user interface display according to one embodiment of the invention.

Referring to FIG. 3, which illustrates an exemplary user interface object and search input region with a hierarchical drop down menu in a user interface display according to one embodiment of the invention. In FIG. 3, user interface 200 includes user interface icon 301, text entry region 307, and drop down menu 309 including a plurality of search parameters and advanced option, and hierarchical submenu 305. As discussed above in connection with previous figures, selecting user interface icon 301 causes search drop down menu 311 to be presented disposed adjacent to and directly below user interface icon 301. Additionally, selecting one of the user interface search parameters, such as "file type" parameter 303, within search drop down menu 311 causes the presentation of hierarchical submenu 305. In this case, the "file type" search parameter 303 has been selected causing the presentation of hierarchical submenu 305 which includes a plurality of file attributes to be selected in order to perform search with a user-defined scope. In this way, a user can further refine search criteria within a simple and easily understood search menu selected by merely depressing search interface icon 301. It should be noted that hierarchical drop down submenu 305 may be operable to select one of the plurality of file attributes such as a PDF, word, JPEG, MP3, and etc., or hierarchical submenu 305 may be operable, in other embodiments, to select one or more of the plurality of file attributes contained therein. As discussed above, an advance option such as advanced option 309 is included within the search drop down menu 311. The advanced option may also include a plurality of file attributes including PDF, word, JPEG3, MP3 and etc. Either way, a user can define the scope of the search by selecting one or more of a plurality of search criteria within menu 311, advanced options 309, and/or hierarchical submenu 305.

Figure 4:
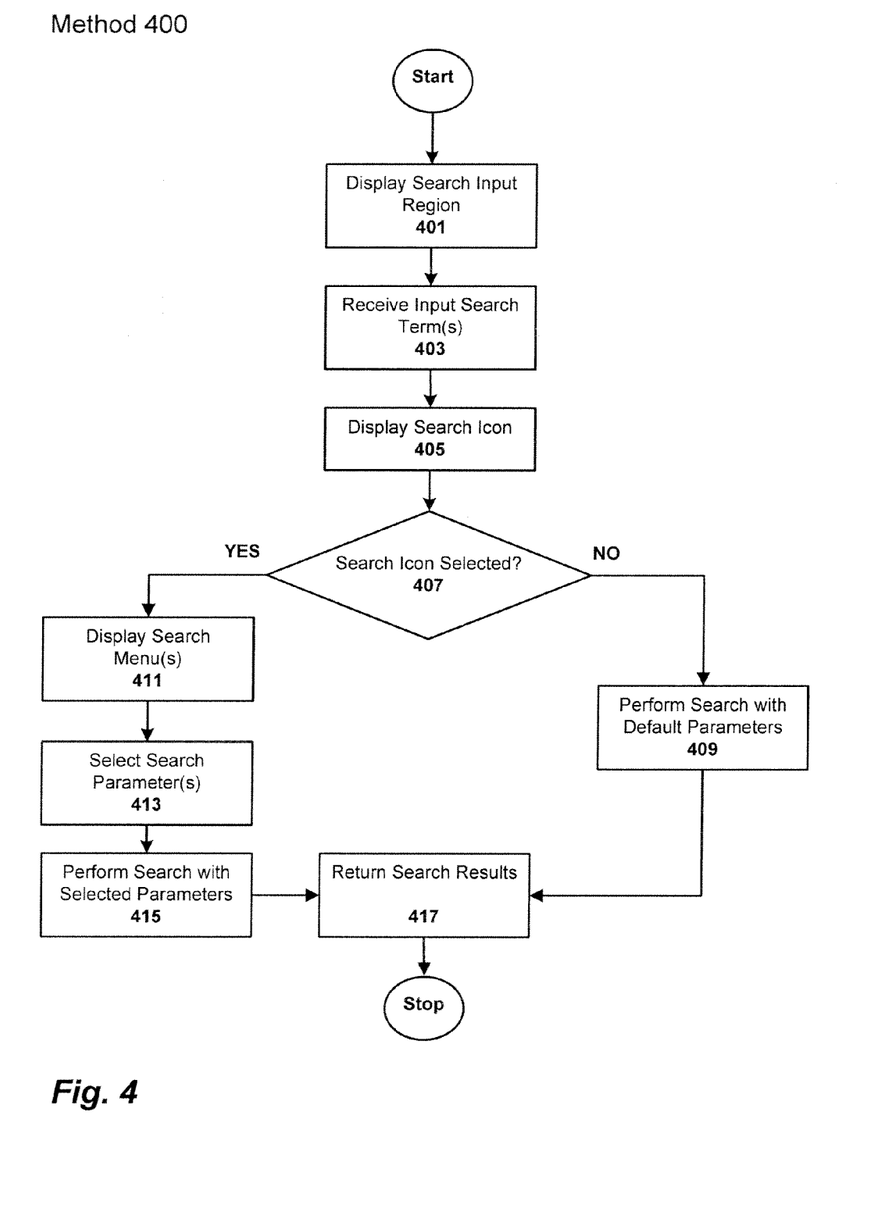
FIG. 4 illustrates an exemplary method for performing a search using a user interface object with drop down menu(s) according to one embodiment of the invention.

Additionally, as discussed above, text entry region 307 exists to further refine the scope of the search by including one or more list of key search terms within text entry region 307. This is illustrated by reference to method 400 of FIG. 4 which illustrates an exemplary method for performing a search using a user interface object with a search drop down menu(s) to according to one embodiment of the invention. In method 400, at step 401, the search input region is displayed, and control flows to step 403, where the search input term or terms is received from the user. Additionally, the search icon is displayed in step 405, and control flows to step 407 where it is determined whether the user interface icon, such as user interface icon 301 has been selected. If the search icon has not been selected, control flows to step 409 where, as discussed previously, a search is performed using the default parameters based on the input to the text region only. However, if the user interface icon has been selected, control flows to step 411 where the display of the search menu is performed. Once the display menu is performed, the search parameter or parameters are selected in step 413. The search is then performed based on the selected parameters in step 415 and the search results are returned to the display in the step 417. This completes method 400.

Figure 5:
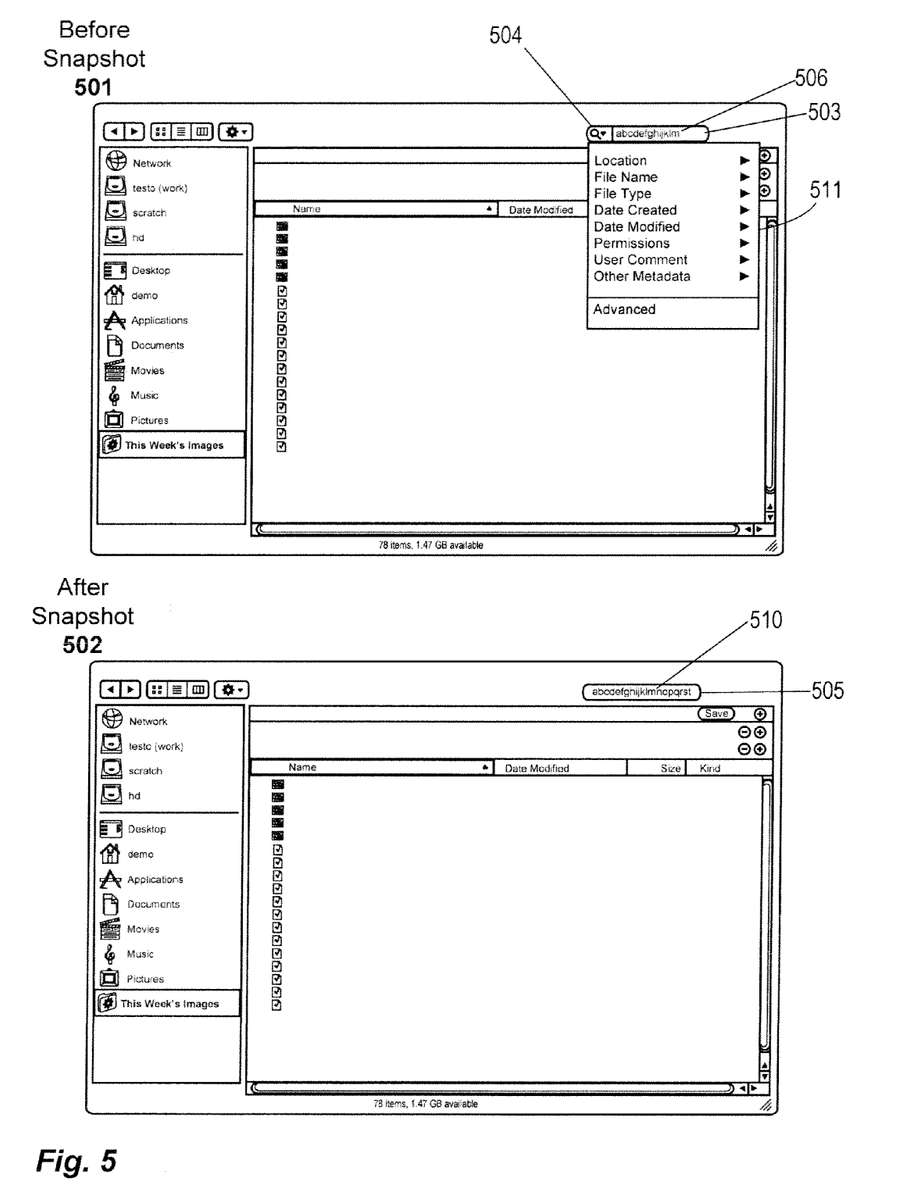
FIG. 5 illustrates before and after snapshots of an exemplary user interface object and search input region with a drop down menu(s) in a user interface display according to another embodiment of the invention.

Referring to FIG. 5, which illustrates a before and after snapshots of an exemplary user interface object and search input region with drop down menu in a user interface display according to one embodiment of the invention. In FIG. 5, before snapshot 501 includes search drop down menu 511 comprising text entry region 503, user interface icon 504, and search text input 506, "abcdefghijklm." Search text input 506 is input into text entry region 503 adjacent to user interface icon 504. As can be seen, the search text input 506 fits nicely within text entry region 503 even if search user interface icon 504 is present.

Referring now to after snapshot 502 which includes only search input text 510, "abcdefghijklmnopqrst," and text entry region 505. In contrast to before snapshot 501, after snapshot 502 illustrates the case when the search input text, such as search input text 510, becomes so long that the user interface icon, such as user interface icon 504, disappears from view. In this case, search input text 510 is input into search text entry region 505 and exceeds a predefined length for display with user interface icon 504. Therefore, in after snapshot 502, whenever user search input text 510 becomes longer than a predefined length, the user interface icon 504 disappears. That is, the presentation of user interface icon 504 is removed so as to enable the search input text such as search input text 510 to be displayed so as to fit nicely within text entry region 505. In one embodiment of the invention, this feature removes the possibility of selecting the user interface icon 504 in order to effect the search drop down menu. However, the present invention is not so limited. Other embodiments of the invention may allow search drop down menu 511 to be displayed even when search input icon 504 is not present. For example, the search input icon could pop up when a user cursors over to the leftmost region of the text entry region 505 in the after snapshot 502 case. In such a case, search drop down menu 511 would be actuated even though the presence of user interface icon 405 was momentarily removed from view within the user interface. Additional embodiments may include other ways of displaying the menu when user interface icon 504 is not displayed.

Figure 6:
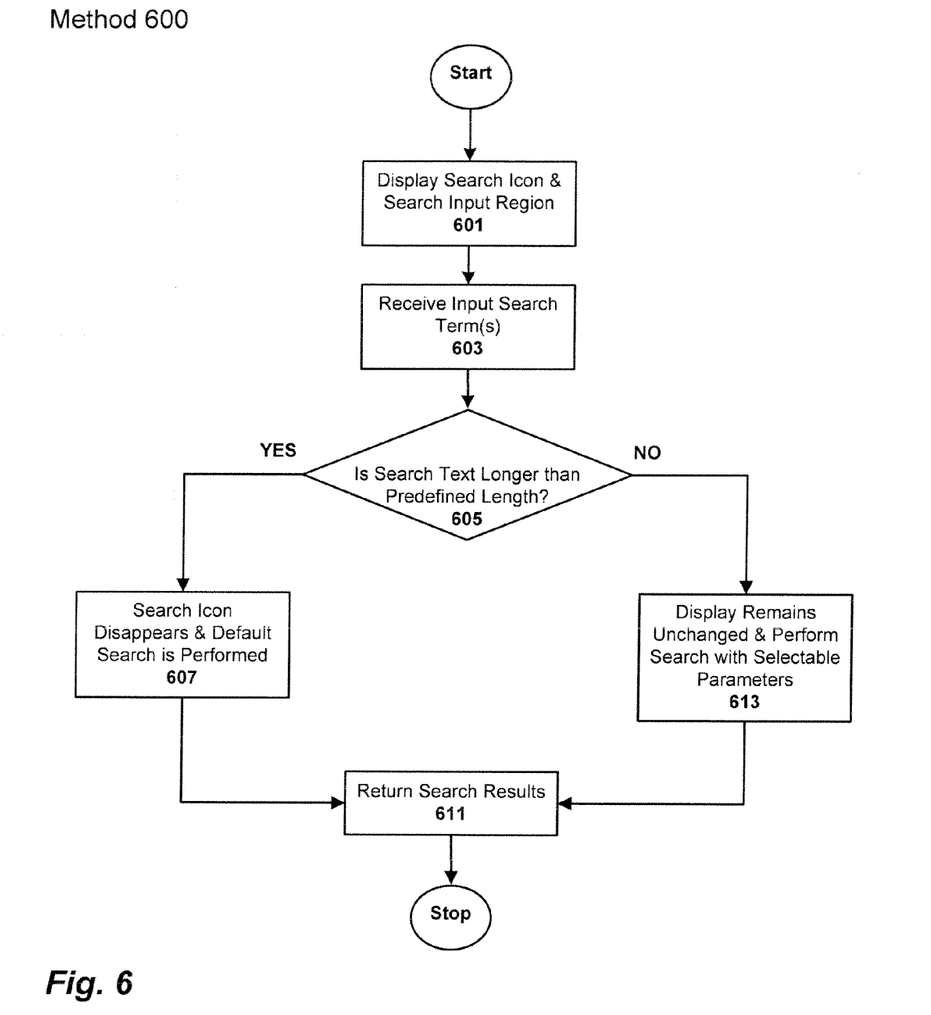
FIG. 6 illustrates an exemplary method for performing a search using a user interface object with drop down menu(s) according to another embodiment of the invention.

Referring now to FIG. 6 which illustrates an exemplary method for performing a search using a user interface object with a drop down menu according to another embodiment of the invention. In step 601, the search icon and the search input region are displayed. Search input terms are received at step 603 and, at step 605, it is determined whether the search text is longer than the predefined length. If so, the search icon disappears and a default search is performed in step 607. The search results are returned in step 611 and this ends method 600. If the search text is not longer than a predefined length, then controls flows to step 613 where the display remains unchanged and a search is performed using either the default parameters or one or more selected parameters from the drop down menu, such as drop down menu 511 or FIG. 5. Control flows 611 where the search results are returned and method 600 is complete.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Accordingly, the scope and spirit of the invention should be judged in terms of the claims which follow.

What is claimed is:

1. A machine implemented method comprising:
   displaying, on a display device, a search input region, the search input region being configured to receive an input for a search of data on a data processing system coupled to the display device;
   displaying, within the search input region, a single user interface object which, if selected, causes the display of a single menu, disposed adjacent to the user interface object, of a plurality of selectable parameter search options to configure how to perform the search; and increasing the bounded area of the search input region by ceasing the displaying of the user interface object within the search input region in response to entry of a predetermined length of text in the search input region.

2. The method of claim 1, further comprising displaying a border around the search input region, wherein the border surrounds the user interface object.

3. The method of claim 2, wherein the menu, when displayed, extends beyond the border which is substantially rectangular, and wherein the border defines a visual content of the search input region.

4. The method of claim 3, wherein the menu comprises at least one of:
 (a) a specification of at least one location to search;
 (b) a specification of a file attribute to search, the file attribute comprising at least one of file type, file name, date of creation, date of modification, permissions information, user comments associated with a file, and metadata associated with a file; and
 (c) an advanced option which when selected causes the presentation of a user interface allowing the selection of a plurality of search criteria.

5. The method of claim 4, wherein the specification of at least one location is a list of a plurality of locations in the menu and the specification of a file attribute is a list of a plurality of file attributes.

6. The method of claim 5, wherein the search input region appears empty before a user enters a search query in the search input region.

7. The method of claim 6, wherein the user interface object appears to be within the search input region.

8. The method as in claim 1, wherein the menu is not displayable while ceasing the displaying of the user interface object within the search input region, and wherein the certain amount predefined length of text exceeds a size of the search input region.

9. The method of claim 1, wherein the single user interface object is displayed adjacent to a menu bar at an edge of a border of a screen of the display device.

10. A non-transitory machine readable medium containing executable program instructions which when executed by a data processing system cause a method to be performed, the method comprising:
 displaying, on a display device, a search input region, the search input region being configured to receive an input for a search of data on a data processing system coupled to the display device; and
 displaying, within the search input region, a single user interface object which, if selected, causes the display of a single menu, disposed adjacent to the user interface object, of a plurality of selectable search parameter options to configure how to perform the search; and
 increasing the bounded area of the search input region by ceasing the displaying of the user interface object within the search input region in response to entry of a predefined length of text in the search input region.

11. The non-transitory medium of claim 10, wherein the method further comprising displaying a border around the search input region wherein the border surrounds the user interface object.

12. The non-transitory medium of claim 11, wherein the menu, when displayed, extends beyond the border which is substantially rectangular, and wherein the border defines a visual content of the search input region.

13. The non-transitory medium of claim 12 wherein the menu comprises at least one of:
 (a) a specification of at least one location to search;
 (b) a specification of a file attribute to search, the file attribute comprising at least one of file type, file name, date of creation, date of modification, permissions information, user comments associated with a file, and metadata associated with a file; and
 (c) an advanced option which when selected causes the presentation of a user interface allowing the selection of a plurality of search criteria.

14. The non-transitory medium of claim 13, wherein the specification of at least one location is a list of a plurality of locations in the menu and the specification of a file attribute is a list of a plurality of file attributes.

15. The non-transitory medium of claim 14, wherein the search input region appears empty before a user enters a search query in the search input region.

16. The non-transitory medium of claim 15, wherein the user interface object appears to be within the search input region.

17. The non-transitory medium as in claim 10, wherein the menu is not displayable while ceasing the displaying of the user interface object within the search input region and wherein the predefined length of text exceeds a size of the search input region.

18. The non-transitory medium as in claim 10, wherein the single user interface object is displayed adjacent to a menu bar at an edge of a border of a screen of the display device.

19. A data processing system comprising:
 means for displaying, on a display device, a search input region, the search input region being configured to receive an input for a search of data on a data processing system coupled to the display device; and
 means for displaying, within the search input region, a single user interface object which, if selected, causes the display of a single menu, disposed adjacent to the user interface object, of a plurality of selectable search parameter options to configure how to perform the search; and
 means for increasing the bounded area of the search input region by ceasing the displaying of the user interface object within the search input region in response to entry of a predefined length of text in the search input region.

20. The data processing system of claim 19, wherein the single user interface object is displayed adjacent to a menu bar at an edge of a border of a screen of the display device.

* * * * *